US012750006B2

(12) United States Patent
Irish et al.

(10) Patent No.: US 12,750,006 B2
(45) Date of Patent: Sep. 29, 2026

(54) BALANCE-CONVERTER CIRCUIT FOR SOLAR MODULES

(71) Applicant: Optivolt Labs, Inc., San Francisco, CA (US)

(72) Inventors: Linda Stacey Irish, San Francisco, CA (US); Sierra Rae King, San Francisco, CA (US)

(73) Assignee: Optivolt Labs, Inc., San Francisco, CA (US)

( * ) Notice: Subject to any disclaimer, the term of this patent is extended or adjusted under 35 U.S.C. 154(b) by 0 days.

(21) Appl. No.: 19/311,285

(22) Filed: Aug. 27, 2025

(65) Prior Publication Data

US 2026/0081557 A1 Mar. 19, 2026

Related U.S. Application Data

(60) Provisional application No. 63/728,610, filed on Dec. 5, 2024, provisional application No. 63/689,413, filed on Aug. 30, 2024.

(51) Int. Cl.
*H02S 40/32* (2014.01)
*H02S 40/36* (2014.01)

(52) U.S. Cl.
CPC .............. *H02S 40/32* (2014.12); *H02S 40/36* (2014.12)

(58) Field of Classification Search
CPC ................................ H02S 40/32; H02S 40/36
See application file for complete search history.

(56) References Cited

U.S. PATENT DOCUMENTS

| | | | | |
|---|---|---|---|---|
| 2014/0062205 | A1 | 3/2014 | Chen et al. | |
| 2017/0179877 | A1 | 6/2017 | Sella et al. | |
| 2019/0140462 | A1 * | 5/2019 | Yin | H02J 7/35 |
| 2020/0343388 | A1 | 10/2020 | Ledenev et al. | |
| 2023/0350446 | A1 * | 11/2023 | Irish | G05F 1/67 |

OTHER PUBLICATIONS

International Search Report and Written Opinion for International Application No. PCT/US25/043691 mailed on Dec. 5, 2025; 10 pages.

Notification of the International Application Number and of the International Filing Date for International Application No. PCT/US25/043691 mailed on Sep. 29, 2025; 1 page.

* cited by examiner

*Primary Examiner* — Jayne L Mershon
(74) *Attorney, Agent, or Firm* — Run8 Patent Group, LLC; Peter Miller

(57) ABSTRACT

A circuit includes: an adjustment section; a power supply section; and a regulator management section. The adjustment section is configured to drive an output voltage, from a set of solar substrings, to a target output voltage. The power supply section is configured to output a regulated voltage that powers the adjustment section. The regulator management section includes: a management switch configured to selectively couple the set of solar substrings to the adjustment section; and a comparator. The comparator is configured to, in response to an input voltage of the regulator falling below a threshold voltage, output a control signal to: a gate of the management switch to transition the management switch into an inactive state to decouple the set of solar substrings from the adjustment section; and a control terminal of the adjustment section to suspend operation of the adjustment section and drive the input voltage toward the threshold voltage.

20 Claims, 5 Drawing Sheets

BALANCE-CONVERTER CIRCUIT FOR SOLAR MODULES

CROSS-REFERENCE TO RELATED APPLICATIONS

This application claims the benefit of U.S. Provisional Application Nos. 63/728,610 filed on 5 Dec. 2024, and 63/689,413 filed on 30 Aug. 2024, each of which is hereby incorporated in its entirety by this reference.

This application is related to U.S. Non-Provisional application Ser. No. 18/211,974, filed on 20 Jun. 2023, which is hereby incorporated in its entirety by this reference.

TECHNICAL FIELD

This invention relates generally to the field of solar modules and, more specifically, to a new and useful circuit for balancing and boosting voltage output from solar modules in the field of solar modules.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Circuit

Figure 1:
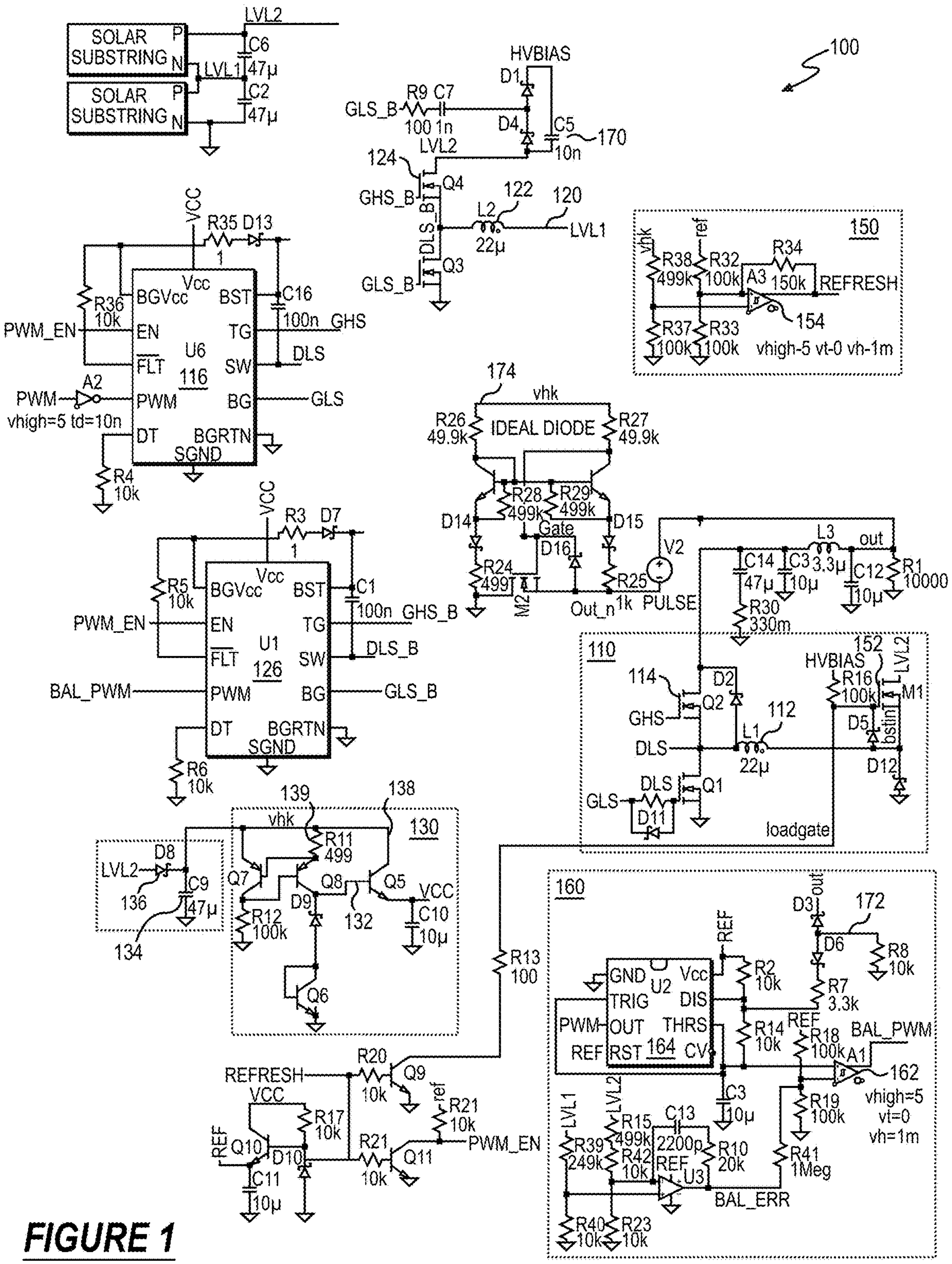
FIG. 1 is a schematic representation of a circuit.
Figure 2A:
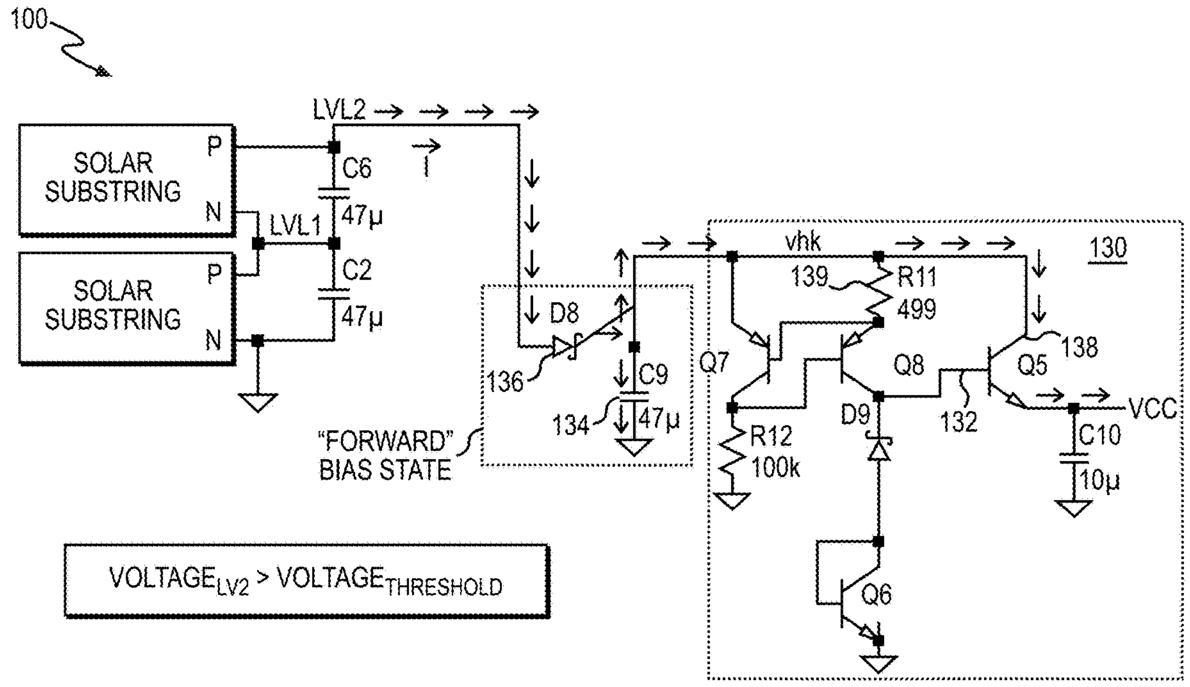
FIGS. 2A and 2B are schematic representations of the circuit.
Figure 2B:
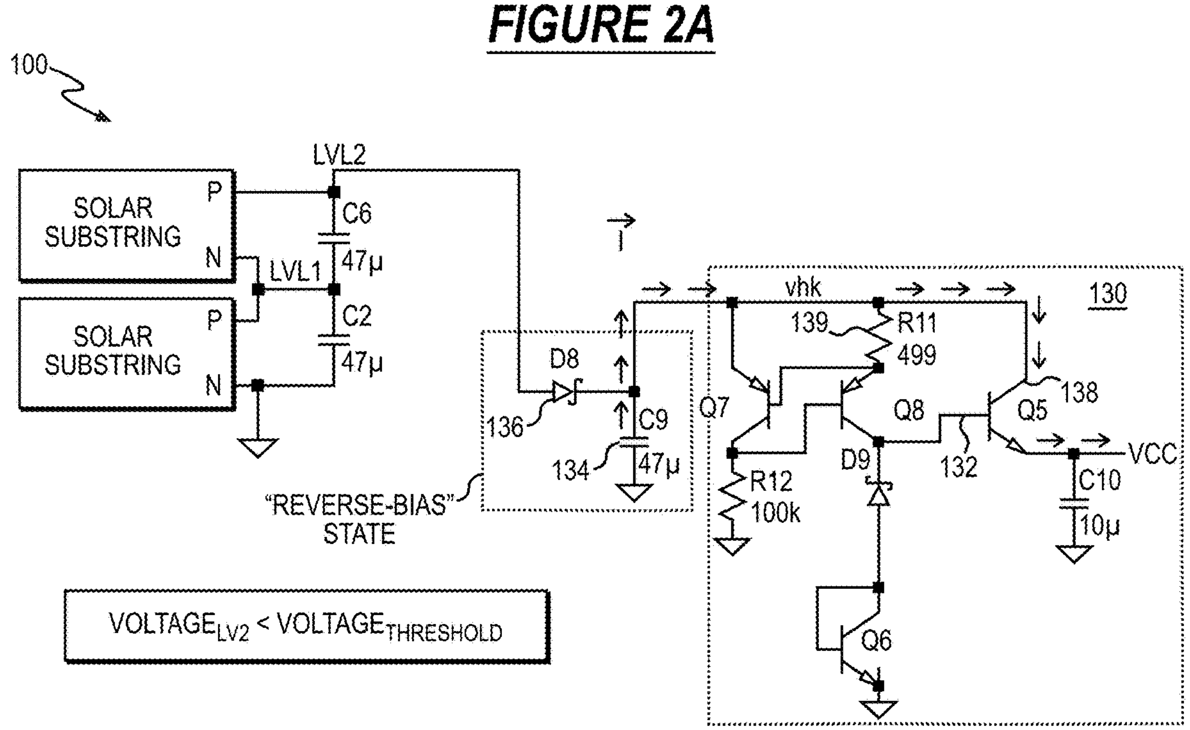
Figure 3A:
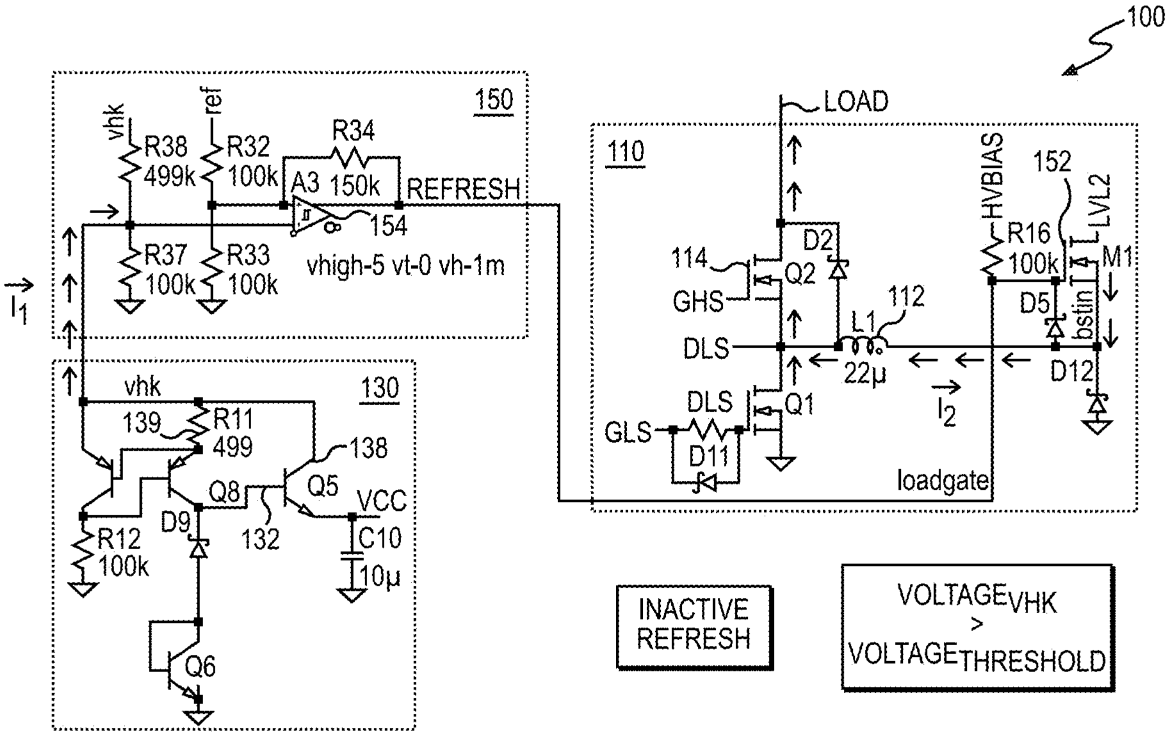
FIGS. 3A and 3B are schematic representations of the circuit.
Figure 3B:
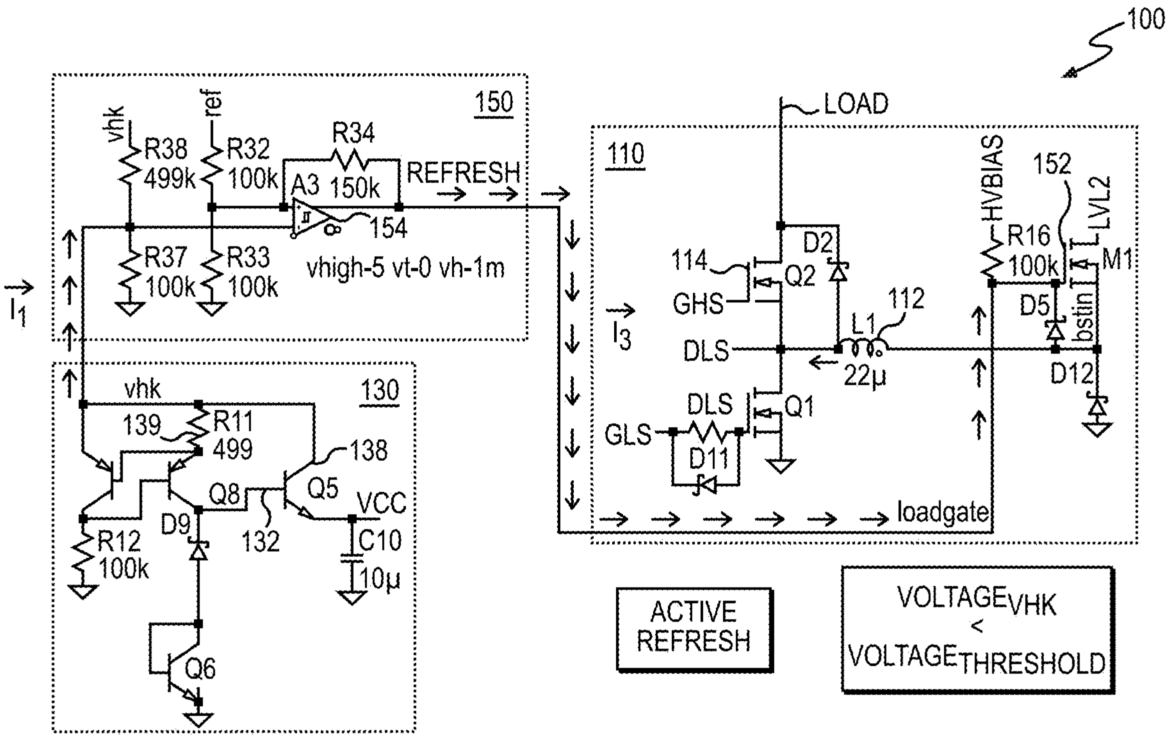
Figure 4A:
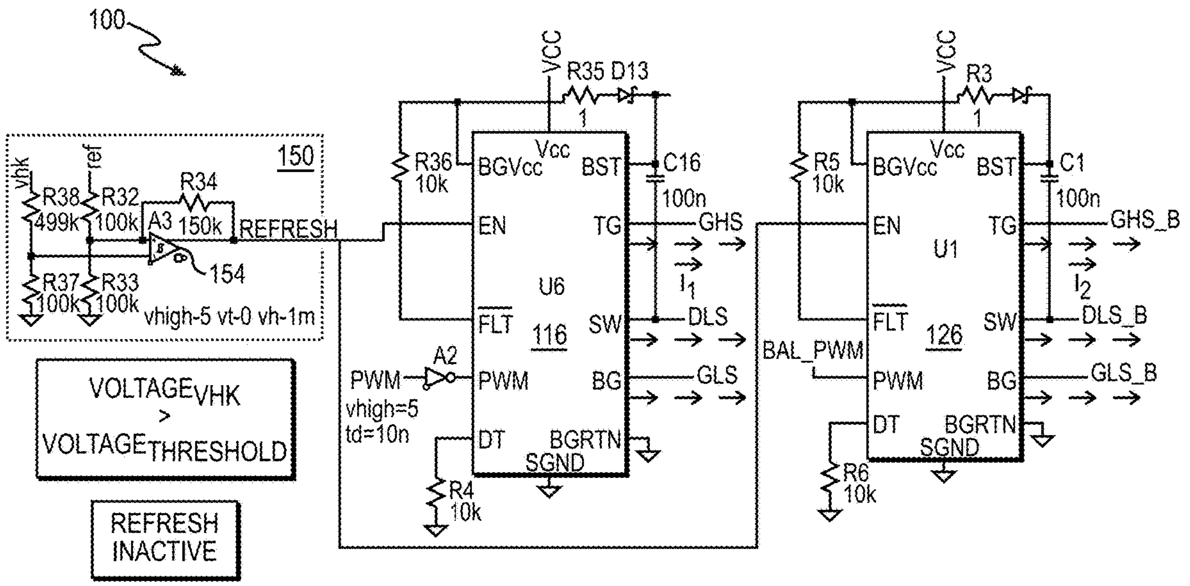
FIGS. 4A and 4B are schematic representations of the circuit.
Figure 4B:
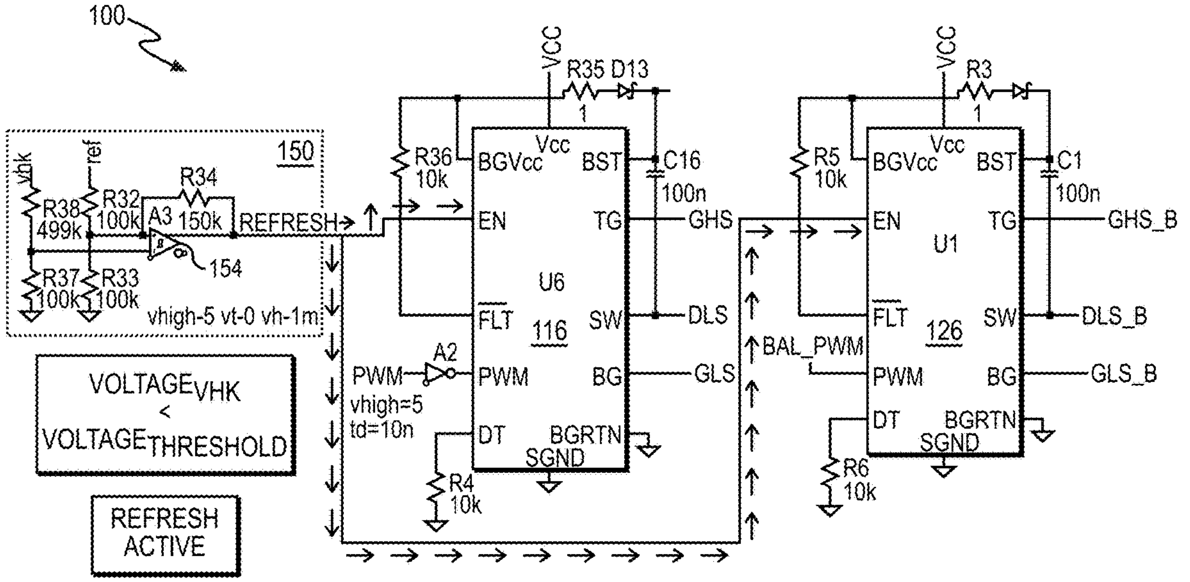
Figure 5:
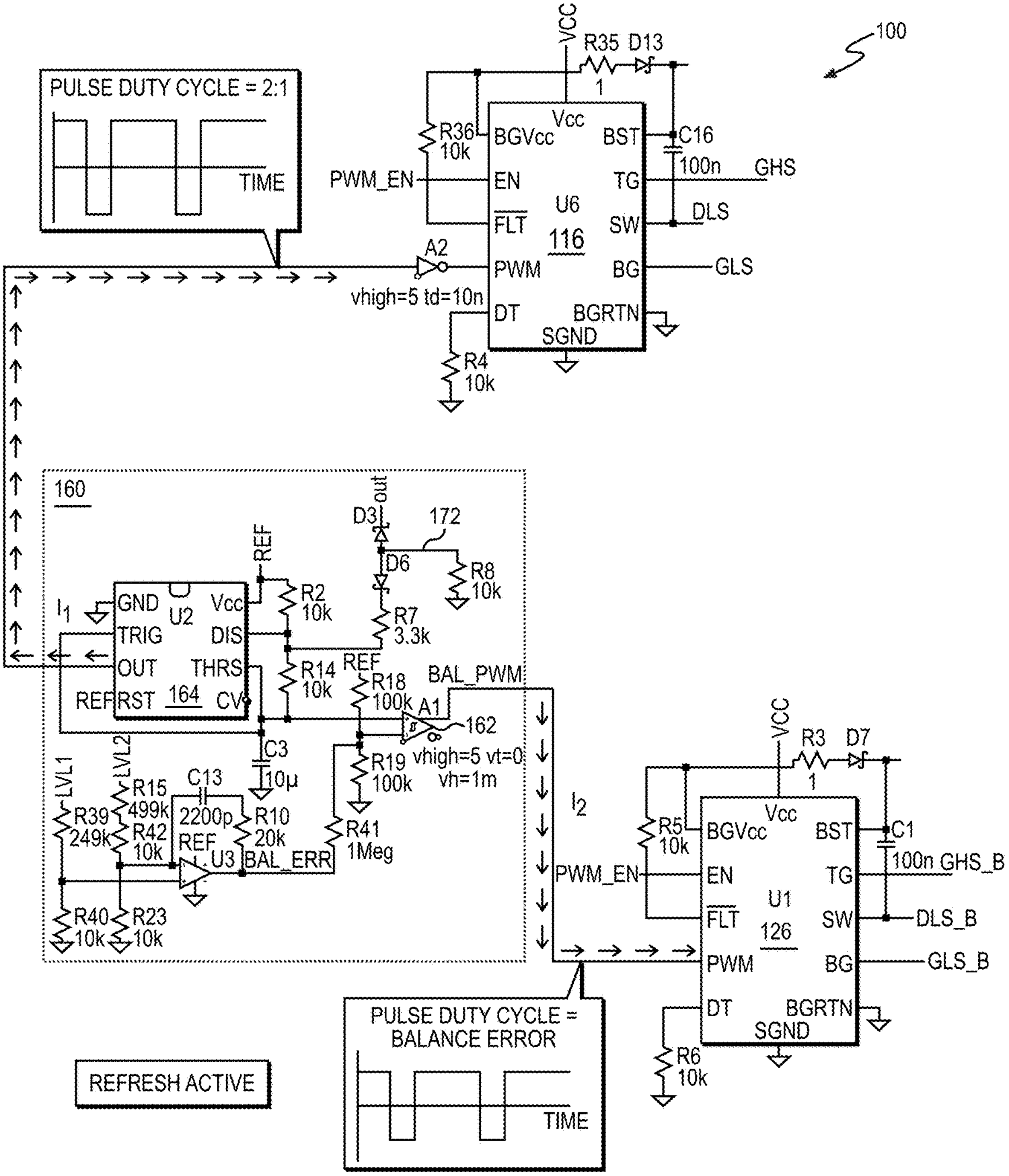
FIG. 5 is a schematic representation of the circuit.

As shown in FIG. 1, a circuit 100 includes: a voltage adjustment section 110; a power supply section 130; and a regulator management section 150.

The voltage adjustment section 110 is configured to supply a target output voltage to a load.

The power supply section 130 includes: a regulator 132 configured to supply a regulated voltage to a first power supply terminal of the voltage adjustment section 110; a management capacitor 134 coupled to a regulator input terminal of the regulator 132; and a first diode 136 coupling a set of solar substrings to the regulator input terminal of the regulator 132.

The regulator management section 150 includes: a management switch 152; and a management comparator 154. The management switch 152 is configured to selectively couple the set of solar substrings to an adjustment input terminal of the voltage adjustment section 110. In response to a first regulator input voltage of the regulator input terminal falling below a threshold input voltage, the management comparator 154 is configured to output a first control signal to: a gate of the management switch 152 to operate the management switch 152 in an inactive state to decouple the set of solar substrings from the adjustment input terminal of the voltage adjustment section 110; and a first control terminal of the voltage adjustment section 110 to suspend operation of the voltage adjustment section 110 to reduce loading of the set of solar substrings to 1) drive the first regulator input voltage of the regulator input terminal toward the threshold input voltage and 2) initiate charging of the management capacitor 134, via the first diode 136, to maintain operation of the regulator 132.

2. Applications

Generally, a circuit 100 is configured to: boost an output voltage, generated by a set of solar substrings, to a target output voltage; and sustain operation of internal drive components during extended reductions in the output voltage from the set of solar substrings that would otherwise interrupt boosting of the output voltage and render the circuit 100 non-operational.

More specifically, the circuit 100 includes: a voltage adjustment section 110 configured to drive the output voltage, generated by the set of solar substrings (e.g., a solar panel), toward the target output voltage supplied to a load (e.g., an inverter); a power supply section 130 configured to supply a regulated voltage that powers the voltage adjustment section 110; and a regulator management section 150 configured to selectively suspend and resume operation of the voltage adjustment section 110—such as during short conditions across the load or overloading conditions of the solar substrings—to reduce loading of the set of solar substrings and maintain operation of the power supply section 130 to prevent brown-out and/or reset conditions during operation of the circuit 100.

The voltage adjustment section 110 includes: an adjustment driver 116; and a boost converter (e.g., a synchronous boost converter) configured to, based on a set of adjustment signals (e.g., pulse-width modulation signals) output from the adjustment driver 116, drive an output voltage generated by the set of solar substrings to the target output voltage (e.g., three times the input voltage generated by the set of solar substrings). The power supply section 130 includes: a regulator 132 (e.g., a linear regulator 132) configured to drive the output voltage from the set of solar substrings to a regulated voltage that powers the adjustment driver 116; a management capacitor 134 coupled to a regulator input terminal of the regulator 132; and a first diode 136 (e.g., a Schottky diode) coupling the set of solar substrings to the regulator input terminal of the regulator 132 and configured to direct current from the set of solar substrings to the regulator input terminal to charge the management capacitor 134. The regulator management section 150 includes: a management switch 152 configured to selectively couple the set of solar substrings to an adjustment input terminal of the boost converter; and a management comparator 154 configured to selectively output control signals to a gate of the management switch 152.

During nominal operation of the circuit 100 (e.g., uniform illumination of the set of solar substrings), the first diode 136 transitions into a forward-bias state to charge the management capacitor 134 and maintain operation of the regulator 132 to supply the regulated voltage that powers internal drive components of the circuit 100. However, during transient drops in output voltage from the solar substrings—such as resulting from short conditions across the load and/or overloading of the solar panel—the first diode 136 transitions into a reverse-bias state to choke current flow from the solar substrings to the regulator input terminal and discharge of the management capacitor 134 to maintain operation of the regulator 132 during these transient drops in output voltage.

During discharge of the management capacitor 134 to maintain operation of the regulator 132 and in response to a regulator input voltage of the regulator input terminal falling below a threshold input voltage, the management comparator 154 is configured to output a first control signal to the gate of the management switch 152 to transition the management switch 152 into an inactive state to choke current from the set of solar substrings to the adjustment input terminal of the boost converter. Additionally, the management comparator 154 outputs the first control signal to a first control terminal of the adjustment driver 116 to suspend operation of the boost converter to reduce loading of the set of solar substrings, which in turn increases output voltage from the set of solar substrings to transition the first diode 136 from the reverse-bias state to the forward-bias state and initiates charging of the management capacitor 134.

During charging of the management capacitor 134 and in response to the regulator input voltage of the regulator input terminal exceeding the threshold input voltage, the management comparator 154 is configured to output a second control signal to the gate of the management switch 152 to connect the set of solar substrings to the adjustment input terminal of the boost converter. Additionally, the management comparator 154 outputs the second control signal to the first control terminal of the adjustment driver 116 to resume operation of the boost converter to drive the target output voltage (and corresponding target output current) to the load.

During time periods of transient drops in output voltage from the set of solar substrings, the circuit 100 can selectively suspend and resume operation of the voltage adjustment section 110 to routinely recharge the power supply section 130 and thus maintain supply of the regulated voltage to the internal drive components of the circuit 100 to prevent brown-out and/or reset conditions of these internal drive components. Therefore, the circuit 100 can prevent loss of functionality in internal drive circuitry that would otherwise permit uncontrolled delivery of full short-circuit current from the set of solar substrings to the load-potentially exceeding a maximum current rating of the load-regardless of operating conditions of the panel or the load.

2.1 Solar Cell Emulation

In one implementation, the voltage adjustment section 110 is configured to emulate a set of solar substrings with a first quantity of solar cells as a second set of solar substrings with a greater quantity of solar cells. This arrangement preserves partial-shade tolerance characteristics of the lower cell count while generating a boosted output voltage that matches the nominal output voltage of a solar panel with the greater cell count.

In this implementation, the adjustment driver 116 can output a set of adjustment signals according to a duty cycle (e.g., a 2:1 duty cycle) that: drives the output voltage from the first set of solar substrings of the first quantity of solar cells to a target output voltage that emulates a nominal output voltage from a second set of solar substrings of a second quantity of solar cells greater than the first quantity of solar cells; and limits the output current from the first set of solar substrings such that the current supplied to the load remains below a maximum current rating of the load. For example, the voltage adjustment section 110 can receive an output voltage of 20 volts from the first set of solar substrings and drive the adjustment switches according to a duty cycle (e.g., a 2:1 duty cycle) that boosts the output voltage to 60 volts. In this example, the voltage adjustment section 110 limits the output current to 3.33 amperes so that the load receives approximately 200 watts of power, while the output current remains below a maximum current rating of the load.

As described above, the regulator management section 150 maintains operation of the regulator 132 to sustain operation of internal drive circuitry of the circuit 100 during short conditions across the load or overloading conditions of the set of solar substrings. The regulator management section 150 thereby ensures that the voltage adjustment section 110 operates only while supplying an output current that remains below the maximum current rating of the load.

2.2 Solar Panel Parallelization

In one implementation, multiple instances of the circuit 100 can interface with a set of solar panels-such as configured to install across a roof of a recreational vehicle (or "RV")-arranged in parallel to each other. Each instance of the circuit 100 drives the output voltage from its respective solar panel to a boosted target output voltage and limits the output current supplied to the load to remain below a maximum current rating of the load. The parallel arrangement of the solar panels increases shade tolerance, while each instance of the circuit 100 ensures that the load never receives full panel short-circuit current under any operating condition.

Therefore, instances of the circuit 100, when implemented across multiple solar panels in parallel, increase the operational resilience of the solar panel array to adverse illumination conditions and maintain controlled current delivery to the load to prevent blowing protection fuses and to reduce fire ignition risk.

3. Solar Panel

Generally, the circuit 100 can interface with: a solar panel including a set of solar substrings; and a load (e.g., a string inverter, a mobile device, a sensor, a robotic system). In one implementation, the circuit 100 can be arranged on a printed circuit 100 board assembly and integrated within a chassis—such as coupled to a rear face of the solar panel—and includes: a positive input terminal electrically coupled to a positive string terminal of the solar panel; and a negative input terminal electrically coupled to a negative string terminal of the solar panel. Furthermore, the circuit 100 can include a positive output terminal and a negative output terminal electrically coupled to the load. Accordingly, the circuit 100 can: receive an output voltage generated by the set of solar substrings on the solar panel; and drive this output voltage to a target output voltage supplied to the load.

4. Circuit+Solar Panel

Generally, the circuit 100 is configured to: balance voltages across solar substrings of the solar panel to a nominal output voltage (e.g., 20 volts); adjust (e.g., increase) this nominal output voltage (e.g., 20 volts) to a target output voltage (60 volts); and maintain this target output voltage (e.g., 60 volts) to a load coupled to the circuit 100. More specifically, the circuit 100 includes: a balance section 120 configured to balance voltages between a primary set of solar substrings and a secondary set of solar substrings of the solar panel (e.g., a mid-point of the solar panel) to a nominal output voltage (e.g., 20 volts); a voltage adjustment section 110 configured to adjust (e.g., increase) this nominal output voltage (e.g., 20 volts) to a target output voltage (e.g., 60 volts); a power supply section 130 configured to supply a regulated voltage that powers the balance section 120 and the voltage adjustment section 110; and a regulator management section 150 configured to maintain a target regulated voltage (e.g., 5 volts) to internal drive components (i.e., gate drivers) of the balance section 120 and the voltage adjustment section 110.

Therefore, regardless of illumination conditions affecting the solar panel, the circuit 100 can: maintain a target output voltage (e.g., 60 volts) supplied to a load coupled to the circuit 100; and maintain a target regulated voltage (e.g., 5.0 volts) to the internal drive components of the circuit 100. Accordingly, by maintaining this target regulated voltage, the circuit 100 can prevent brown-out and/or reset conditions, which can interrupt supply of the target output voltage to the load.

4.1 Power Supply Section

Generally, the power supply section 130 is configured to supply a regulated voltage that powers internal drive components of circuit 100 without reliance on switching activity of the voltage adjustment section 110.

4.1.1 Regulator

In one implementation, the power supply section 130 includes a regulator 132 (e.g., a linear regulator 132) configured to drive an output voltage from the set of solar substrings to this regulated voltage. In this implementation, the regulator 132 can include: a series pass transistor 138 coupling the regulator input terminal to a regulator output terminal; and a set of feedback resistors 139 configured to bias a second gate of the series pass transistor 138 to drive the first regulator input voltage at the regulator input terminal to the regulated voltage at the regulator output terminal.

More specifically, the regulator 132 (e.g., a linear regulator 132) can include: a series pass transistor 138 coupling the regulator input terminal to a regulator output terminal; a feedback network including a set of resistors coupled between the regulator output terminal and a reference node and configured to generate a feedback voltage proportional to the regulated voltage; and bias circuitry coupled to a control terminal of the series pass transistor 138 and configured to drive the conduction state of the series pass transistor 138 based on a difference between the feedback voltage and a reference voltage to generate the regulated voltage. Accordingly, the regulator 132 can thus supply this regulated voltage to a power rail that directs this regulated voltage across the internal drive components of the circuit 100.

Therefore, the regulator 132 supplies the regulated voltage to the power rail independent of switching operation of the voltage adjustment section 110, which increases susceptibility of the regulated voltage to voltage sag during extended operation of the internal drive components from the management capacitor 134.

4.1.2 Management Capacitor+Management Switch

In one implementation, the power supply section 130 further includes: a first diode 136 electrically coupling the set of solar substrings to a regulator input terminal of the regulator 132, the first diode 136 defining a forward-bias conduction threshold and a reverse-bias blocking threshold; and a management capacitor 134 electrically coupled to the regulator input terminal and configured to store electrical energy to maintain operation of the regulator 132 during a transient voltage drop of the set of solar substrings.

Accordingly, in response to the output voltage from the set of solar substrings exceeding the forward-bias conduction threshold, the first diode 136 is configured to transition into a forward-bias state to: direct current from the set of solar substrings to the regulator input terminal of the regulator 132 to charge the management capacitor 134; and supply an initial voltage to the regulator input terminal to enable the regulator 132 to generate the regulated voltage. Additionally, in response to the output voltage from the set of solar substrings falling below the reverse-bias threshold—such as during a transient drop in output voltage from the set of solar substrings—the first diode 136 is configured to transition into a reverse-bias state to choke current flow from the set of solar substrings to the regulator input terminal of the regulator 132 to discharge the management capacitor 134 and maintain operation of the regulator 132 during this transient drop in output voltage from the set of solar substrings.

For example, the power supply section 130 can include a management capacitor 134 with a capacitance value selected to maintain a voltage at the regulator input terminal that is substantially equal to the output voltage from the set of solar substrings immediately prior to a transient voltage drop. In this example, the management capacitor 134 supplies the regulator input voltage during the transient voltage drop to enable the regulator 132 to continue supplying the regulated voltage to the power rail without interruption.

Therefore, the power supply section 130 maintains the regulator input voltage during a transient drop in output voltage from the set of solar substrings to prevent failure of the regulator 132 and to enable the regulator management section 150 to respond and adjust operation of the voltage adjustment section 110 accordingly.

4.2 Voltage Adjustment Section

In one implementation, the circuit 100 includes an output converter (e.g., boost converter, buck converter, boost/buck converter): including a set of adjustment switches 114 coupled to an output voltage (e.g., level-two output voltage) of the solar panel; and configured to adjust (e.g., increase) the output voltage (e.g., 20 volts) from the solar panel to a target output voltage (e.g., 60 volts) according to an adjustment signal (e.g., boost duty cycle) supplied to the output converter. In this implementation, the circuit 100 further includes an adjustment driver 116 (e.g., gate driver): coupled to the output converter; and configured to supply a set of adjustment signals (e.g., power wave modulation "PWM" signals) at a boost duty cycle (e.g., 2:1 boost duty cycle) that defines a boost ratio for adjusting the output voltage—from the set of solar substrings—to the set of adjustment switches 114. Accordingly, during a voltage conversion cycle, the adjustment driver 116 can drive the set of adjustment signals (e.g., at the boost duty cycle) to the output converter to adjust the output voltage (e.g., 20 volts) from the solar panel to a target output voltage (e.g., 60 volts) and maintain this target output voltage to a load regardless of illumination conditions affecting the solar panel.

Therefore, rather than supply an output voltage that is a multiple of a least-illuminated substring from the solar panel to a load, the circuit 100 can: adjust a nominal output voltage (e.g., 20 volts) from the set of solar substrings to a target output voltage (e.g., 60 volts); and supply this target output voltage to the load coupled to the circuit 100 regardless of illumination conditions affecting the solar panel.

4.2.1 Adjustment Driver

In one implementation, the adjustment driver 116 includes: a power supply terminal configured to receive the regulated voltage from the regulator 132 to power the adjustment driver 116; a modulation terminal configured to receive a modulation signal that defines the duty cycle (e.g., 2:1 duty cycle) for the set of adjustment signals; and a control terminal configured to receive control signals from the regulator management section 150 in order to selectively suspend and resume operation of the adjustment driver 116. As described above, during transient drops in output voltage from the set of solar substrings, the regulator 132 supplies the regulated voltage to the power supply terminal of the adjustment driver 116 to maintain operation of the adjustment driver 116 throughout the transient drop.

4.2.2 Boost Converter

In one implementation, the boost converter includes a single-switch boost topology configured to drive the output voltage from the solar substrings to the target output voltage. In this implementation, the boost converter includes: an adjustment inductor 112 coupled to the management switch 152 and configured to receive a first output voltage from the set of solar substrings; and a set of adjustment switches 114 (e.g., transistors) configured to, based on a set of adjustment signals output from the adjustment driver 116, drive the first output voltage to the target output voltage supplied to the load. For example, the set of adjustment switches 114 can include a set of transistors cooperating to form a half-bridge defining: a switching node coupled to the adjustment inductor 112; a boost output terminal coupled to the load; and a ground terminal coupled to a reference potential. More specifically, during supply of the set of adjustment signals to the set of adjustment switches 114, the set of adjustment switches 114 alternate between active and inactive states according to the duty cycle to: alternate electrical coupling of the adjustment inductor 112 between the load and a reference potential; and drive the output voltage from the set of solar substrings toward the target output voltage.

However, the boost converter can implement alternative boost converter topologies—such as a synchronous boost converter, an interleaved boost converter, or a coupled-inductor boost converter—that are configured to drive the first output voltage from the set of solar substrings to the target output voltage supplied to the load.

4.2.3 Signal Generator+Static Duty Cycle

In one implementation, the circuit 100 includes a signal generator 160: powered by the regulated voltage supplied by the regulator 132; and configured to supply a static (or "stable") modulation signal, at a target duty cycle (e.g., 2:1 duty cycle) to the adjustment driver 116. In this implementation, the signal generator 160 includes a resistor-capacitor timing network and an oscillator stage configured to generate a periodic waveform at a fixed frequency, and integrated comparator circuitry configured to compare the periodic waveform to a reference threshold to generate the modulation signal at the target duty cycle. The target duty cycle remains static during operation so that the boost ratio between the first output voltage from the set of solar substrings and the target output voltage supplied to the load remains substantially constant.

For example, the signal generator 160 can output a modulation signal with a 2:1 duty cycle to the adjustment driver 116, resulting in a boost ratio of approximately three. In this example, when the first output voltage from the set of solar substrings is 20 volts, the boost converter drives the target output voltage supplied to the load to approximately 60 volts, while the output current is correspondingly reduced to maintain constant power transfer. However, other variations of the circuit 100 can define other ratios for the boost duty cycle to adjust (or "boost") the output voltage from the solar panel to any n-multiple.

4.2.3.1 Voltage Clamp

In one implementation, the circuit 100 further includes a voltage clamp 172: coupling a boost output terminal of the voltage adjustment section 110 to a control terminal of the signal generator 160; and configured to, in response to a second output voltage of the boost output terminal exceeding the target output voltage, output a second control signal to the control terminal of the signal generator 160 to trigger the signal generator 160 to drive a second modulation signal, different from the first modulation signal, to the first modulation terminal of the voltage adjustment section 110.

In one example, the voltage clamp 172 includes: a resistor divider network coupled to the boost output terminal; a clamp comparator configured to compare a scaled voltage of the second output voltage to a clamp reference voltage; and an output driver configured to generate the second control signal in response to the comparison. Accordingly, the voltage clamp 172 is configured to, in response to a load voltage exceeding 60 volts, trigger the clamp comparator to change state to output the second control signal to the signal generator 160. Accordingly, the signal generator 160: decreases the duty cycle of the modulation signal supplied to the first modulation terminal of the voltage adjustment section 110; and thus reduces the boost ratio to bring the load voltage toward the target output voltage.

Therefore, the circuit 100 includes the voltage clamp 172 to maintain the output voltage to the load at or below the target output voltage to prevent exceeding the maximum voltage rating of the load.

4.2.4 Backfeeding

In one implementation, the circuit 100 includes a second diode 174 (e.g., an ideal diode): coupling the regulator input terminal of the regulator 132 to the load; and configured to, during operation of the management switch 152 in the inactive state, transition into a reverse-bias state to choke current flow from the load to the regulator input terminal of the regulator 132.

For example, the second diode 174 can define an ideal diode including: a transistor (e.g., a MOSFET transistor) configured as a unidirectional conduction element between the regulator input terminal and the load; a control circuit 100 including a differential amplifier 164 configured to sense a voltage drop between the transistor drain and source; and a gate driver powered by the regulator input voltage and configured to drive the transistor gate in response to the sensed voltage drop. The control circuit 100 is configured to: in response to the load voltage exceeding the regulator input voltage, remove gate drive to the transistor to transition the transistor to a high-impedance state to inhibit reverse current flow from the load to the regulator input terminal; and, in response to the regulator input voltage exceeding the load voltage, drive the transistor into conduction to permit forward current flow from the regulator input terminal to the load.

Therefore, the second diode 174 isolates the regulator input terminal from reverse current flow originating at the load during short conditions, voltage imbalances, or parallel source operation. This isolation prevents backfeeding that could deplete the management capacitor 134, disrupt regulator 132 operation, or damage input components of the power supply section 130.

4.2.5 Variation: Variable Duty Cycle

In this implementation, the signal generator 160 can include a variable control (e.g., potentiometer, digital control) that adjusts the ratio of the boost duty cycle for the modulated signal supplied to the set of adjustment switches 114. In one example, the load coupled to the circuit 100 corresponds to a 50-volt rechargeable battery. In this example, an operator can adjust the ratio of the boost duty cycle for the modulated signal in order to achieve a target output voltage of 60 volts to supply charge to the rechargeable battery. However, other variations of the circuit 100 can autonomously modify the boost duty cycle for the modulation signal according to a detected and/or retrieved voltage draw for the load coupled to the circuit 100.

In another implementation, the circuit 100 includes a controller configured to adjust the boost duty cycle of the modulation signal supplied to the set of adjustment switches 114. The controller can modify the duty cycle in response to one or more feedback signals—such as a detected load voltage, a detected load current, or a detected output power—to maintain the target output voltage or to limit output current according to the maximum current rating of the load. Adjustment of the duty cycle by the controller can optimize charging profiles for energy storage devices, improve conversion efficiency across varying illumination conditions, and compensate for voltage drop caused by wiring or connection losses between the circuit 100 and the load.

4.3 Balance Section

As described in U.S. Non-Provisional application Ser. No. 18/211,974, the circuit 100 can include: a half bridge coupled to a secondary power level of the solar panel; and a converter (e.g., a bidirectional buck converter) coupling the primary half bridge to the primary power level of the solar panel and configured to balance voltages of solar substrings across the primary power level and the secondary power level of the solar panel to a nominal operating voltage.

The half bridge includes a set of balance switches 124 (e.g., transistors) including: a balance input terminal coupled to the secondary power level of the solar panel; a ground terminal coupled to a ground rail (e.g., virtual ground); and a switching node interposed between the set of balance switches 124. The balancing section includes: a balancing inductor (e.g., 10 micro-Henries) coupling the switching node to the primary power level of the solar panel and configured to balance current across the primary power level and the secondary power level of the solar panel; and a balancing capacitor (e.g., 10 micro-Farads) arranged in series with the balancing inductor and configured to balance voltages across the primary power level and the secondary power level of the solar panel. Additionally, the balance section 120 can further include a balance driver 126 (e.g., gate driver) coupled to the set of balance switches 124 and configured to supply a set of balance signals (e.g., complimentary modulation signals at a 50% duty cycle) to alternate coupling to the switching node between the balance input terminal and the ground terminal.

Furthermore, to accommodate for voltage variations in the load coupled to the circuit 100 and voltage variations during balancing of the solar substrings, the balance driver 126 can further include a feedback loop configured to maintain supply of the set of balance signals at a 50% duty cycle.

Accordingly, during non-uniform illumination conditions across the primary power level and the secondary power level of the solar panel, the balance driver 126 can drive a set of balance signals to the set of balance switches 124 to balance voltages of solar substrings across the primary power level and the secondary power level. Therefore, rather than limiting the total output voltage of the solar panel to a voltage of a least-illuminated substring of the solar panel, the circuit 100 can balance voltages across a primary power level and a secondary power level of the solar panel to generate a nominal operating voltage that is greater than the least illuminated substring of the solar panel.

4.3.1 Balance Modulation Signal

In one implementation, the circuit 100 can include a balance control network configured to leverage the timing of the signal generator 160 to generate a balance modulation signal. The balance control network includes comparators and differential amplifiers arranged: to detect a voltage imbalance between a midpoint of the set of solar substrings and a reference potential; and to shape the resulting balance modulation signal in synchronization with the timing of the signal generator 160. The balance driver 126: receives the balance modulation signal; and, based on the balance modulation signal, generates the set of balance signals supplied to the set of balance switches 124.

In this implementation, the balance control network can include: a differential amplifier 164 configured to generate a balance error signal based on a difference between the midpoint output voltage and the output voltage; and a balance comparator 162 configured to receive a periodic timing signal from the signal generator 160. The balance comparator 162 is configured to: generate a balance modulation signal, according to a balance duty cycle, based on the balance error signal and the periodic timing signal; and supply the balance modulation signal, according to the balance duty cycle, to a modulation terminal of the balance driver 126. Accordingly, the balance driver 126 can then: generate the set of balance signals based on this balance modulation signal; and drive the set of balance signals to the set of balance switches 124 to 1) alternate electrical coupling to the balance inductor 122, according to the balance duty cycle, between the string output terminal and the reference potential and 2) drive the midpoint output voltage of the midpoint terminal toward a target midpoint voltage approximating half of the first output voltage from the set of solar substrings.

For example, the balance control network can operate with a periodic timing signal at 100 kilohertz generated by the signal generator 160 and a sawtooth amplitude of 2.0 volts at the balance comparator 162 input. The differential amplifier 164 can generate a balance error signal proportional to the difference between a target midpoint voltage and a measured midpoint voltage, with a gain of 1.0 volts per volt and a target midpoint voltage equal to one-half of the first output voltage. In a 20.0-volt operating case, the target midpoint voltage equals 10.0 volts. In a high-midpoint case (midpoint equal to 11.0 volts), the differential amplifier 164 outputs a 1.0-volt error. The balance comparator 162 compares the 1.0-volt error to the sawtooth amplitude of 2.0 and outputs a balance modulation signal at 50 percent duty cycle (1.0 volts divided by 2.0 volts). The balance driver 126, in response to the 50 percent duty cycle, switches the balance inductor 122 to sink charge from the midpoint node toward the reference potential, which drives the midpoint voltage toward 10.0 volts.

Therefore, the circuit 100 can implement balancing by leveraging the timing of the signal generator 160 that outputs the static adjustment modulation signal, without inclusion of a separate balance signal generator or a dedicated controller for balancing.

4.3.2 Dedicated Balance Signal Generator

In one implementation, the circuit 100 can include a dedicated signal generator for the balance section 120 that operates independently of the signal generator 160 for the voltage adjustment section 110. The dedicated balance signal generator: can be powered by a separate local supply or powered by the regulator 132 of the circuit 100; and is configured to generate a balance modulation signal with a fixed or variable duty cycle without drawing power or timing references from the signal generator 160 supplying the modulation signal to the voltage adjustment section 110.

In another implementation, the circuit 100 can include a controller configured to execute active balancing control for the balance section 120. The controller can: monitor the midpoint output voltage and the first output voltage from the set of solar substrings; calculate a balance error; and dynamically adjust the duty cycle and phase of the balance modulation signal to drive the midpoint output voltage toward the target midpoint voltage. In one example, the circuit 100 can include a dedicated balance signal generator powered through an isolated DC supply derived from a local transformer winding that maintains electrical isolation from the regulated voltage supplied to the voltage adjustment section 110. In this example, the dedicated balance signal generator continues to generate the balance modulation signal during refresh cycles and other transient events, thus enabling the balance section 120 to operate continuously without interruption from the operational state of the voltage adjustment section 110.

4.3.2 Multiple Balance Sections

In one implementation, the circuit 100 can include multiple instances of the balance section 120 configured to independently drive different voltage nodes of the set of solar substrings. Each balance section 120 includes a dedicated balance driver 126, a set of balance switches 124, and a balance inductor 122 coupled to a corresponding voltage node of the solar panel. In this configuration, each balance section 120 operates to regulate the midpoint voltage of its respective node toward a target midpoint voltage, thereby equalizing voltage distribution across different panel segments. By balancing multiple voltage nodes in parallel, the circuit 100 increases shade-tolerance performance by mitigating localized voltage depression in one section of the panel from limiting current generation across the remaining sections.

4.4 Regulator Management Section

In one implementation, the circuit 100 includes a regulator management section 150 configured to momentarily suspend operation of the voltage management section (and the balance section 120)—such as during a short condition and/or overloading of the set of solar substrings—to maintain operation of the regulator 132 to supply the regulated voltage that powers the voltage adjustment section 110 (and the balance section 120) and thus, prevent a short condition between the set of solar substrings and the output of the load. In this implementation, the regulator management section 150 includes: a management switch 152 configured to selectively couple the set of solar substrings to the adjustment input terminal of the voltage management section; and a management comparator configured to, based on input voltage of the regulator input terminal, output control signals to the management switch 152 and internal drive components of the circuit 100 to momentarily suspend operation of the voltage adjustment section 110 and/or the balance section 120.

During operation of the circuit 100, the output voltage of the solar panel (e.g., level-two output voltage) is supplied to the regulator 132 in order to maintain operation of the voltage management section, which in turn maintains the target output voltage (e.g., 60 volts) to the load. However, due to varying illumination conditions affecting the solar panel, overloading of the set of solar substrings on the solar panel, and/or short conditions across the load, the output voltage of the solar panel supplied to the regulator 132 can transiently fall below a threshold output, which can result in non-operation of the circuit 100 and formation of a short condition between the output voltage from the solar panel and the load.

Therefore, during a transient voltage drop in output voltage from the set of solar substrings, the regulator management section 150 can selectively: decouple the set of solar substrings from the voltage adjustment section 110 to prevent propagation of a short condition to the load and to permit the power supply section 130 to recharge the management capacitor 134; and connect the set of solar substrings to the voltage adjustment section 110 to regulate output current supplied to the load within the maximum current rating of the load during the transient voltage drop.

4.4.1 Management Switch+High Voltage Bias

In one implementation, the management switch 152 includes a transistor (e.g., a metal-oxide-semiconductor field-effect transistor) including: a gate configured to receive control signals from the management comparator 154; a source configured to receive the output voltage from the set of solar substrings; and a drain coupled to the voltage management section (e.g., to the adjustment inductor 112). In this implementation, the management switch 152 is configured to, based on control signals output by the management comparator 154 received at the gate, alternate between an active state and an inactive state to selectively connect the set of solar substrings to the voltage management section.

Accordingly, the circuit 100 includes a high-voltage bias configured to elevate the gate-to-source voltage of the management switch 152 above the threshold voltage required to transition the management switch 152 between the active state and the inactive state. The high-voltage bias is generated from the balance section 120 and is applied to the gate of the management switch 152 in combination with the control signals from the management comparator 154 to support transition of the management switch 152 between the active state and the inactive state.

In one implementation, the circuit 100 includes a high-voltage bias including a bootstrap capacitor 170: coupled to the string output terminal of the set of solar substrings; and configured to charge during alternate electrical coupling of the balance inductor 122 between the string output terminal of the set of solar substrings and the reference potential and thus, supply a bias voltage to the gate of the management switch 152. The management switch 152 is configured to, in response to the bias voltage and the first control signal exceeding a threshold gate voltage, transition from the inactive state to the active state to connect the set of solar substrings to the adjustment input terminal of the voltage adjustment section 110.

Therefore, the management switch 152 functions as a selective interface that controls electrical coupling between the set of solar substrings and the voltage adjustment section 110.

4.4.2 Comparator

In this implementation, the management comparator 154 includes: a non-inverting input configured to receive a stable output reference voltage (e.g., 1.5 volts) based on the regulated voltage output from the regulator 132, such as by coupling the non-inverting input to a stable reference voltage divider coupled to a power rail that receives the regulated voltage from the regulator 132; an inverting input configured to receive a variable management reference voltage based on the regulator input voltage of the regulator input terminal of the regulator 132, such as by coupling the inverting input to a variable reference voltage divider coupled to the regulator input terminal of the regulator 132; and a comparator output terminal configured to supply a refresh signal (e.g., active, inactive) to a load gate of the management switch 152 that transitions the management switch 152 from an active state to an inactive state.

Accordingly, based on differences between the variable reference voltage and the stable voltage—which correspond to differences between the output voltage from the set of solar substrings and a threshold voltage (or "housekeeping voltage) for operation of the regulator 132—the management comparator 154 can supply control signals (e.g., active, inactive): to the management switch 152 to selectively connect and decouple the set of solar substrings from the adjustment input terminal of the voltage management section; and to control terminals of the voltage adjustment section 110 and the balance selection to selectively suspend and resume operation of these sections without requiring resynchronization between the drivers and the signal generator 160.

In response to the output voltage from the set of solar substrings falling below the threshold input voltage of the regulator 132, the management comparator 154 is configured to output a first control signal (e.g., an inactive signal) to: the gate of the management switch 152 to transition the management switch 152 into the inactive state to decouple the set of solar substrings from the adjustment input terminal of the voltage management section; a first control terminal of the adjustment driver 116 to suspend operation of the voltage management section; and a second control terminal of the balance driver 126 to suspend operation of the balance section 120.

In response to the output voltage from the set of solar substrings exceeding a threshold input voltage of the regulator 132, the management comparator 154 is configured to output a second control signal (e.g., an active signal) to: the gate of the management switch 152 to transition the management switch 152 into the active state to connect the set of solar substrings from the adjustment input terminal of the voltage management section; the first control terminal of the adjustment driver 116 to resume operation of the voltage management section without requiring resynchronization between the adjustment driver 116 and the signal generator 160; and the second control terminal of the balance driver 126 to resume operation of the balance section 120 without requiring resynchronization between the balance driver 126 and the signal generator 160.

Therefore, the management comparator 154 can monitor the regulator input voltage and, based on the regulator input voltage falling below or exceeding the threshold input voltage, suspend operation of the internal drivers to permit the power supply section 130 to recharge the management capacitor 134.

5. Refresh Cycle

In one implementation, the circuit 100 is configured to initiate a refresh cycle in response to a regulator input voltage falling below a threshold input terminal. In this implementation, operating events or fault conditions can drive the output voltage from the set of solar substrings below the forward-bias threshold of the first diode 136, which in turn drives the regulator input voltage below the threshold input voltage. In response, the management capacitor 134 discharges to supply the regulator input voltage and maintain operation of the regulator 132 during the voltage drop.

However, during extended events—such as sustained short conditions at the load or prolonged overload conditions of the set of solar substrings—the management capacitor 134 continues to discharge until the stored energy is depleted, which results in loss of regulator 132 operation. Thus, the circuit 100, via the regulator management section 150, can momentarily suspend operation of the internal drivers during the extended events to reduce loading of the set of solar substrings, thereby increasing the output voltage from the set of solar substrings above the forward-bias threshold of the first diode 136 to recharge the management capacitor 134 and maintain continued operation of the regulator 132.

Therefore, the circuit 100 can, without an external controller or active monitoring of the regulator 132, initiate refresh cycles to recharge the power supply section 130 and maintain continued operation of the regulator 132 to: eliminate the need for resynchronization of the internal drivers with the signal generator 160 following prolonged fault conditions; and maintain supply of the target output current from the set of solar substrings to the load during the prolonged fault conditions to prevent exceeding a maximum current rating of the load.

5.1 Management Capacitor Discharge

In one implementation, in response to a first output voltage from the set of solar substrings falling below a threshold output voltage, such as during overloading of the set of solar substrings, the first diode 136 is configured to transition into a reverse-bias state to: choke current flow from the set of solar substrings to the regulator input terminal of the regulator 132; discharge of the management capacitor 134 to 1) supply an initial regulator input voltage to the regulator input terminal; and maintain operation of the regulator 132 to drive the initial regulator input voltage to the regulator 132 voltage supplied to the first power supply terminal of the voltage adjustment section 110.

Accordingly, in response to the initial regulator input voltage of the regulator input terminal exceeding the threshold input terminal and during discharge of the management capacitor 134, the management comparator 154 is configured to drive an initial control signal (e.g., active control signal) to: the gate of the management switch 152 to transition the management switch 152 into an active state to supply the first output voltage from the set of solar substrings to the adjustment input terminal of the voltage adjustment section 110; the first control terminal to maintain operation of the voltage adjustment section 110 to drive the first output voltage to the target output voltage supplied to the load; and the second control terminal to maintain operation of the balance section 120 to drive the midpoint output voltage of the set of solar substrings toward the target midpoint voltage.

Furthermore, in response to the initial regulator input voltage decaying to the first regulator input voltage that falls below a threshold input voltage and during discharge of the management capacitor 134, the management comparator 154 is configured to output the first control signal (e.g., inactive control signal) to: the gate of the management switch 152 to transition the management switch 152 into the inactive state to decouple the set of solar substrings from the adjustment input terminal of the voltage adjustment section 110; the first control terminal of the voltage adjustment section 110 to suspend operation of the voltage adjustment section 110 to reduce loading of the set of solar substrings; and the second control terminal of the balance section 120 to suspend operation of the balance section 120 and reduce loading of the set of solar substrings.

Therefore, in response to a prolonged period of discharge of the management capacitor 134 that degrades operation of the regulator 132, the circuit 100 can suspend operation of the voltage management section and the balance section 120 to reduce load and electrical stress on the set of solar substrings, thereby enabling the set of solar substrings to recover output voltage from the transient drop.

5.2 Management Capacitor Charge

Following suspended operation of the voltage adjustment section 110 and the balance section 120, the output voltage of the set of solar substrings increases to a level sufficient to forward-bias the first diode 136 and recharge the management capacitor 134, thereby restoring continued operation of the regulator 132. In this implementation, in response to a second output voltage from the set of solar substrings, following suspension of the voltage adjustment section 110 and the balance section 120, the first diode 136 is configured to transition into a forward-bias state to: direct current from the set of solar substrings to the regulator input terminal; drive the first regulator input terminal toward the threshold input terminal; and charge the management capacitor 134.

Accordingly, in response to a second regulator input voltage of the regulator input terminal remaining below the threshold input voltage and during charging of the management capacitor 134, the management comparator 154 is configured to output a second control signal (e.g., an inactive signal) to: the gate of the management switch 152 to maintain operation of the management switch 152 in the inactive state to maintain decoupling of the set of solar substrings from the adjustment input terminal of the voltage adjustment section 110; and the first control terminal of the voltage adjustment section 110 to maintain the voltage adjustment section 110 in suspended operation; and the second control terminal of the balance section 120 to maintain the balance section 120 in suspended operation.

Additionally, in response to a third regulator input voltage of the regulator input terminal exceeding the threshold input voltage and during charge of the management capacitor 134, the management comparator 154 is configured to drive a third control signal (e.g., an active signal) to: the gate of the management switch 152 to transition the management switch 152 into the active state to supply the second output voltage from the set of solar substrings to the adjustment input terminal of the voltage adjustment section 110; the first control terminal of the voltage adjustment section 110 to resume operation of the voltage adjustment section 110 to drive the first output voltage from the set of solar substrings to the target output voltage; and the second control terminal of the balance section 120 to resume operation of the balance section 120 to drive the midpoint input voltage toward the target midpoint voltage.

Therefore, the circuit 100 can charge the management capacitor 134 and autonomously resume operation of the voltage adjustment section 110 and the balance section 120 without requiring external control or intervention. Accordingly, the circuit 100 can repeat the refresh cycle to alternate between charging and discharging of the management capacitor 134 during recurring transient voltage drops or extended fault conditions to sustain operation of the regulator 132.

5.1.1 Suspending+Resuming Voltage Adjustment Section

In one implementation, the circuit 100 is configured to selectively suspend and resume operation of the voltage adjustment section 110 by driving control signals, via the management comparator 154, to the first control terminal of the adjustment driver 116 of the voltage adjustment section 110.

In this implementation, in response to the first regulator input voltage of the regulator input terminal falling below a threshold output voltage, the management comparator 154 is configured to output the first control signal to the first control terminal of the adjustment driver 116 to: suspend supply of the set of adjustment signals to the set of adjustment switches 114 of the boost converter; and suspend driving the first output voltage from the set of solar substrings toward the target output voltage to reduce loading of the set of solar substrings. Additionally, in response to the second regulator input voltage of the regulator input terminal exceeding the threshold output voltage, the management comparator 154 is configured to output the second control signal to the first control terminal of the adjustment driver 116 to: resume supply of the set of adjustment signals to the set of adjustment switches 114; and resume driving the first output voltage from the set of solar substrings toward the target output voltage.

Therefore, during the refresh cycle, the adjustment driver 116 remains powered by the regulated voltage supplied by the regulator 132 and remains synchronized with the signal generator 160. Accordingly, the voltage adjustment section 110 can transition directly from suspended operation to active operation without a resynchronization period, enabling immediate resumption of driving the first output voltage from the set of solar substrings toward the target output voltage.

5.1.2 Pausing Balance Section

In one implementation, the circuit 100 is configured to selectively suspend and resume operation of the balance section 120 by driving control signals, via the management comparator 154, to the second control terminal of the balance driver 126 of the balance.

In this implementation, in response to the first regulator input voltage of the regulator input terminal falling below the threshold input voltage, the management comparator 154 is configured to output the first control signal to a second control terminal of the balance driver 126 to: suspend supply of the set of balance signals to the set of balance switches 124; and suspend driving the midpoint output voltage of the string midpoint terminal toward the target midpoint voltage to reduce loading of the set of solar substrings. Additionally, in response to a second regulator input voltage of the regulator input terminal exceeding the threshold input voltage, the management comparator 154 is configured to output a second control signal to the second control terminal of the balance driver 126 to: resume supply of the set of balance signals to the set of balance switches 124; and resume driving the midpoint output voltage of the string midpoint terminal toward the target midpoint voltage.

Therefore, during the refresh cycle, the balance driver 126 remains powered by the regulated voltage supplied by the regulator 132 and remains synchronized with the signal generator 160. Accordingly, the balance section 120 can transition directly from suspended operation to active operation without a resynchronization period, enabling immediate resumption of driving the midpoint output voltage of the set of solar substrings toward the target midpoint voltage.

6. Example: Short Condition

In one example, a short condition across the load drives the output voltage from the set of solar substrings below the threshold output voltage. In this example, the short condition pulls the output voltage from the set of solar substrings toward zero volts, which increases the output current from the set of solar substrings. The circuit 100 is configured to inhibit the increase in output current from reaching the shorted load by suspending operation of the voltage adjustment section 110 and decoupling the set of solar substrings from the adjustment input terminal.

In this example, in response to the short condition across the load driving the first output voltage from the set of solar substrings below the threshold output voltage, the first diode 136 is configured to transition into a reverse bias configuration to: choke current flow from the set of solar substrings to the regulator input terminal; and discharge of the management capacitor 134 to supply the first regulator input voltage to the regulator input terminal. Accordingly, during discharge of the management capacitor 134, the voltage adjustment section 110 is configured to: drive a first output current from the set of solar substrings to a target output current; and supply the target output current to the load during the short condition. Furthermore, in response to the first regulator input voltage falling below the threshold input voltage, the management comparator 154 is configured to output the first control signal to the gate of the management switch 152 to transition the management switch 152 into the inactive state to choke current flow of the first output current to the load during the short condition.

Therefore, during operation of the voltage adjustment section 110, the shorted load receives only the target output current limited by the voltage adjustment section 110. In response to degradation of the regulator input voltage below the threshold input voltage, the management comparator 154 outputs the first control signal to transition the management switch 152 into the inactive state, thereby suspending operation of the voltage adjustment section 110 to choke current flow to the shorted load and protect the shorted load from overcurrent conditions.

7. Solar Panel Emulation

In one implementation, the circuit 100 is configured to electrically emulate a solar panel coupled to the circuit 100 as having a greater quantity of solar cells than are physically present, while retaining a lower quantity of large solar cells in the actual panel. The greater quantity of solar cells is associated with a higher nominal output voltage, while the lower quantity of large solar cells preserves shade-tolerance characteristics by limiting the number of cells that can be partially shaded at any given time. In this implementation, the circuit 100 ensures that the solar panel never experiences full load current from the connected load. The voltage adjustment section 110 is configured such that, during its operation, the load receives the boosted output voltage regardless of the panel's native voltage, thereby achieving the electrical emulation of the higher-cell-count panel.

In one example, the circuit 100 can interface with a solar panel comprising 36 large cells arranged to generate a nominal output voltage of 20 volts and a maximum output current of 10 amperes. The voltage adjustment section 110, operating at a boost ratio of three-to-one, can drive the panel's 20-volt output to a target output voltage of 60 volts supplied to the load while limiting the target output current to 3.33 amperes. In this configuration, the circuit 100 enables the 36-cell panel to electrically emulate a higher-cell-count panel—such as a 108-cell panel—rated at 60 volts and approximately 200 watts, while physically retaining the smaller 36-cell panel footprint.

Therefore, the circuit 100 enables installation of smaller solar panels in constrained mounting areas—such as on recreational vehicle roofs—while delivering the functional characteristics of larger, higher-voltage panels. This arrangement also increases operational safety by limiting current delivery to the load below rated thresholds during normal operation and fault conditions.

7.1 Legacy Panel Upgrade

In one implementation, the circuit 100 can be integrated into an older, lower-voltage solar panel to electrically emulate the output voltage of newer, higher-voltage panels in an array of solar panels. The voltage adjustment section 110: boosts the native voltage of the older solar panel to match the nominal voltage of the newer solar panel in the array of solar panels; and limits current output from this older solar panel to ensure that the older panel does not exceed a rated output current during operation or during fault conditions.

In one example, the circuit 100 can be installed on a 24-volt nominal panel rated at 250 watts and deployed in an array of new 48-volt nominal panels rated at 350 watts each. The voltage adjustment section 110 boosts the output voltage of the 24-volt panel to 48 volts and limits the output current to match the operating current profile of the new solar panels, thus enabling the older solar panel to operate in parallel with the newer solar panels without mismatched current flow or adverse loading effects.

Therefore, the circuit 100 enables older, lower-voltage panels to remain in service within upgraded arrays, improving energy yield without requiring physical replacement of the panels. This integration increases the life of legacy hardware, reduces waste, and allows for smooth electrical compatibility with modern high-voltage systems.

7.2 Voltage Standardization

In one implementation, instances of the circuit 100 can be coupled to an array of solar panels with different chemical compositions—such as monocrystalline silicon, polycrystalline silicon, and thin-film technologies—that inherently exhibit different native voltages, current ratings, and current-voltage curve characteristics. Without voltage standardization, these differences can result in performance mismatches, suboptimal loading, or complex string design to maintain electrical compatibility with a load. The voltage adjustment section 110 of each instance boosts or regulates the native panel voltage of each panel, in the array of solar panels, to a common target voltage while maintaining current limits to match design parameters of the array of solar panels.

In one example, an array can include first solar panel formed of 72-cell monocrystalline rated at 36 volts nominal, a second solar panel formed of 60-cell polycrystalline rated at 30 volts nominal, and a third solar panel formed of thin-filmed cells rated at 70 volts nominal. Each panel interfaces with an instance of the circuit 100 configured to output a standardized 48 output voltage to a load. The standardized voltage enables the mixed-technology array to operate in parallel to a shared 48-volt battery bank or inverter without requiring separate power point tracking channels or isolation.

Therefore, instances of the circuit 100 can integrate an array of solar panels with different chemical compositions, manufacturing vintages, or electrical profiles into a unified, performance-optimized system. Thus, the array of solar panels can leverage the unique characteristics of each panel type-such as the high efficiency of monocrystalline panels, the lower cost of polycrystalline panels, and the diffuse-light performance of thin-film panels-within a single array while maintaining consistent voltage delivery to the load.

8. Array of Parallel Solar Panels

In one implementation, instances of the circuit 100 can be integrated into an array of solar panels arranged in parallel, where each solar panel includes a voltage adjustment section 110 to boost a native solar panel voltage to a common target output voltage. Parallel solar panel arrangements improve shade tolerance because the electrical output of one solar panel is independent of the electrical output of other solar panels in the array. Accordingly, in response to a first solar panel, in the array of solar panels, experiencing reduced illumination, the instances of the circuit 100 can maintain delivery of target output voltage and target current to the load without limitation from the shaded solar panel performance.

In this implementation, parallel arrangements of solar panels without current control can pose safety risks. A solar panel in a fault state, such as a short condition or internal bypass diode failure, can sink current from other solar panels in the array, resulting in overheating, tripping protection devices, or damaging conductors. Each instance of the circuit 100 can mitigate these risks by limiting output current to a target output current and by selectively decoupling the faulty solar panel from the array under fault conditions.

In one example, an array includes two solar panels arranged in parallel, each with an integrated instance of the circuit 100. Both instances of the voltage adjustment section 110 are configured to boost a native solar panel voltage to 48 volts and limit output current to 5 amperes. In this example, a first solar panel enters a short condition that drives the solar panel output voltage toward zero volts, while a second solar panel operates nominally. The second solar panel sustains the 48-volt target output at the load by supplying current within the target output current. A first instance of the circuit 100 coupled to the first solar panel can then, via the regulator management section 150, choke current flow to the load and prevent backfeeding from the second solar panel.

Therefore, the circuit 100 enables flexible parallel solar panel array design that delivers boosted voltage to the load for improved power transfer while ensuring fault isolation and compliance with safety standards.

7. Variation: Controller

In one implementation, the circuit 100 includes a controller configured to: read an output voltage from the regulator 132, such as following startup of the circuit 100; and, in response to the output voltage approximating a target regulated voltage (e.g., 5.0 volts), trigger a set of drivers (e.g., balance driver 126, adjustment driver 116) to initiate voltage balancing cycles and voltage adjustment cycles. More specifically, the controller is configured to: trigger the balance driver 126 to supply the balance duty cycle to the set of balance switches 124 to balance voltage between the first set of solar substrings and the second set of solar substrings across the inductor to the nominal output voltage; and trigger the adjustment driver 116 to supply the boost duty cycle to the set of adjustment switches 114 to adjust (e.g., increase) the nominal output voltage (e.g., 20 volts) to the target output voltage (e.g., 60 volts) that emulates the solar panel as containing a quantity of solar cells greater than a combination of solar cells in the first set of solar substrings and the second set of solar substrings.

Therefore, the circuit 100 can, via the controller, trigger a set of drivers (e.g., balance driver 126, adjustment driver 116) to: maintain a nominal output voltage (e.g., 20 volts) across solar substrings of the solar panel; and maintain a target output voltage (e.g., 60 volts)—that emulates the solar panel as containing a quantity of solar cells (e.g., 120 solar cells) exceeding a quantity of solar cells currently arranged on the solar panel (e.g., 30 solar cells)—to a load.

5.1 Independent Comparator Operation

In one implementation, the management comparator 154 (e.g., hysteresis comparator) is integrated into the circuit 100 to routinely recharge the management capacitor 134 independent of controls executed by the controller. However, other variations of the circuit 100 can include the controller configured to selectively pause and initiate charging of the management capacitor 134.

6. Disclaimer

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

The invention claimed is:

1. A system comprising:

a voltage adjustment section configured to supply a target output voltage to a load;

a power supply section comprising:

a regulator configured to supply a regulated voltage to a first power supply terminal of the voltage adjustment section;

a management capacitor coupled to a regulator input terminal of the regulator; and a first diode coupling a set of solar substrings to the regulator input terminal of the regulator; and a regulator management section comprising:

a management switch configured to selectively couple the set of solar substrings to an adjustment input terminal of the voltage adjustment section; and a comparator configured to, in response to a first regulator input voltage of the regulator input terminal falling below a threshold input voltage, output a first control signal to:

a gate of the management switch to transition the management switch into an inactive state to decouple the set of solar substrings from the adjustment input terminal of the voltage adjustment section; and a first control terminal of the voltage adjustment section to suspend operation of the voltage adjustment section to reduce loading of the set of solar substrings to:

drive the first regulator input voltage of the regulator input terminal toward the threshold input voltage; and initiate charging of the management capacitor, via the first diode, to maintain operation of the regulator.

2. The system of claim 1, wherein, during suspended operation of the voltage adjustment section to reduce loading of the set of solar substrings:

the first diode is configured to, in response to a first output voltage from the set of solar substrings exceeding a threshold output voltage, transition into a forward-bias state to direct current from the set of solar substrings to the regulator input terminal to:

drive the first regulator input voltage toward the threshold input voltage; and charge the management capacitor; and the comparator is configured to, in response to a second regulator input voltage at the regulator input terminal exceeding the threshold input voltage, output a second control signal to:

the gate of the management switch to transition the management switch into an active state to supply the first output voltage from the set of solar substrings to the adjustment input terminal of the voltage adjustment section; and the first control terminal of the voltage adjustment section to resume operation of the voltage adjustment section to:

drive the first output voltage from the set of solar substrings to the target output voltage; and supply the target output voltage to the load.

3. The system of claim 1:

wherein the first diode is configured to, in response to a first output voltage from the set of solar substrings falling below a threshold output voltage, transition into a reverse-bias state to:

choke current flow from the set of solar substrings to the regulator input terminal of the regulator; and trigger discharge of the management capacitor to:

supply an initial regulator input voltage to the regulator input terminal; and maintain operation of the regulator to drive the initial regulator input voltage to the regulated voltage supplied to the first power supply terminal of the voltage adjustment section; and wherein the comparator is configured to, during discharge of the management capacitor:

in response to the initial regulator input voltage of the regulator input terminal exceeding the threshold input voltage, drive an initial control signal to:

the gate of the management switch to transition the management switch into an active state to supply the first output voltage from the set of solar substrings to the adjustment input terminal of the voltage adjustment section; and the first control terminal to maintain operation of the voltage adjustment section to drive the first output voltage to the target output voltage supplied to the load; and in response to the initial regulator input voltage decaying to the first regulator input voltage, output the first control signal to:

the gate of the management switch to transition the management switch into the inactive state to decouple the set of solar substrings from the adjustment input terminal of the voltage adjustment section; and the first control terminal to suspend operation of the voltage adjustment section to reduce loading of the set of solar substrings.

4. The system of claim 1, wherein the voltage adjustment section comprises:

an adjustment inductor:

comprising the adjustment input terminal coupled to the management switch; and configured to receive a first output voltage from the set of solar substrings;

a set of adjustment switches coupled to the adjustment inductor; and an adjustment driver:

comprising the first power supply terminal and the first control terminal; and configured to, prior to suspended operation of the voltage adjustment section, supply a set of adjustment signals to the set of adjustment switches to:

alternate electrical coupling to the adjustment inductor between the load and a reference potential; and drive the first output voltage from the set of solar substrings toward the target output voltage.

5. The system of claim 4, wherein the comparator is configured to:

in response to the first regulator input voltage of the regulator input terminal falling below a threshold output voltage, output the first control signal to the first control terminal of the adjustment driver to:

withhold supply of the set of adjustment signals to the set of adjustment switches; and suspend driving the first output voltage from the set of solar substrings toward the target output voltage to reduce loading of the set of solar substrings; and in response to a second regulator input voltage of the regulator input terminal exceeding the threshold output voltage, output a second control signal to the first control terminal of the adjustment driver to:

resume supply of the set of adjustment signals to the set of adjustment switches; and resume driving the first output voltage from the set of solar substrings toward the target output voltage.

6. The system of claim 4:

further comprising a signal generator configured to supply a first modulation signal, according to a first duty cycle, to a first modulation terminal of the adjustment driver; and wherein the adjustment driver is configured to, prior to suspended operation of the voltage adjustment section:

generate the set of adjustment signals based on the first modulation signal; and supply the set of adjustment signals to the set of adjustment switches to:

alternate electrical coupling to the adjustment inductor, according to the first duty cycle, between the load and the reference potential; and drive the first output voltage from the set of solar substrings toward the target output voltage three times the first output voltage.

7. The system of claim 1, further comprising a balance section comprising:

a balance inductor coupled to a string midpoint terminal between a first subset of solar substrings and a second subset of solar substrings in the set of solar substrings;

a set of balance switches coupled to the balance inductor; and a balance driver:

comprising a second power supply terminal configured to receive the regulated voltage from the regulator; and configured to supply a set of balance signals to the set of balance switches to:

alternate electrical coupling to the balance inductor between a string output terminal of the set of solar substrings and a reference potential; and drive a midpoint output voltage of the string midpoint terminal toward a target midpoint voltage.

8. The system of claim 7, wherein the comparator is further configured to:

in response to the first regulator input voltage of the regulator input terminal falling below the threshold input voltage, output the first control signal to a second control terminal of the balance driver to:

suspend supply of the set of balance signals to the set of balance switches; and suspend driving the midpoint output voltage of the string midpoint terminal toward the target midpoint voltage to reduce loading of the set of solar substrings; and in response to a second regulator input voltage of the regulator input terminal exceeding the threshold input voltage, output a second control signal to the second control terminal of the balance driver to:

resume supply of the set of balance signals to the set of balance switches; and resume driving the midpoint output voltage of the string midpoint terminal toward the target midpoint voltage.

9. The system of claim 7:

further comprising:

a signal generator configured to output a periodic timing signal;

a differential amplifier configured to generate a balance error signal based on a difference between the midpoint output voltage and a first output voltage from the set of solar substrings; and a second comparator configured to:

generate a first modulation signal, according to a balance duty cycle, based on the balance error signal and the periodic timing signal; and supply the first modulation signal to a first modulation terminal of the balance driver; and wherein the balance driver is configured to, prior to suspended operation of the voltage adjustment section:

generate the set of balance signals based on the first modulation signal; and supply the set of balance signals to the set of balance switches to:

alternate electrical coupling to the balance inductor, according to the balance duty cycle, between the string output terminal and the reference potential; and drive the midpoint output voltage of the string midpoint terminal toward the target midpoint voltage, the target midpoint voltage half of the first output voltage from the set of solar substrings.

10. The system of claim 7:

further comprising a bootstrap capacitor:

coupled to the string output terminal of the set of solar substrings; and configured to:

charge during alternate electrical coupling to the balance inductor between the string output terminal of the set of solar substrings and the reference potential; and supply a bias voltage to the gate of the management switch; and wherein the management switch is configured to, in response to the bias voltage and the first control signal exceeding a threshold gate voltage, transition from an active state to the inactive state to decouple the set of solar substrings from the adjustment input terminal of the voltage adjustment section.

11. The system of claim 1:

further comprising:

a signal generator configured to drive a first modulation signal to a first modulation terminal of the voltage adjustment section; and a voltage clamp:

coupling a boost output terminal of the voltage adjustment section to a second control terminal of the signal generator; and configured to, in response to a second output voltage of the boost output terminal exceeding the target output voltage, output a second control signal to the second control terminal of the signal generator to:

trigger the signal generator to drive a second modulation signal, different from the first modulation signal, to the first modulation terminal of the voltage adjustment section; and wherein the voltage adjustment section is configured to, based on the second modulation signal, drive a first output voltage from the set of solar substrings to the target output voltage.

12. The system of claim 1:

wherein the first diode is configured to, in response to a short condition across the load driving a first output voltage from the set of solar substrings below a threshold output voltage, transition into a reverse-bias state to:

choke current flow from the set of solar substrings to the regulator input terminal; and trigger discharge of the management capacitor to supply the first regulator input voltage to the regulator input terminal;

wherein the voltage adjustment section is configured to, during discharge of the management capacitor:

drive a first output current from the set of solar substrings to a target output current; and supply the target output current to the load during the short condition; and wherein the comparator is configured to, in response to the first regulator input voltage falling below the threshold input voltage, output the first control signal to the gate of the management switch to transition the management switch into the inactive state to choke current flow of the first output current to the load during the short condition.

13. The system of claim 1:

wherein the regulator comprises:

a series pass transistor coupling the regulator input terminal to a regulator output terminal of the regulator; and a set of feedback resistors configured to bias a second gate of the series pass transistor to drive the first regulator input voltage at the regulator input terminal to the regulated voltage at the regulator output terminal; and wherein the voltage adjustment section comprises:

an adjustment driver comprising the first power supply terminal:

coupled to the regulator output terminal; and configured to receive the regulated voltage to power the adjustment driver;

an adjustment inductor:

coupled to the management switch; and configured to receive a first output voltage from the set of solar substrings; and a set of adjustment switches configured to, based on a set of adjustment signals output from the adjustment driver, drive the first output voltage to the target output voltage supplied to the load.

14. The system of claim 1, further comprising a second diode:

coupling the regulator input terminal of the regulator to the load; and configured to, during operation of the management switch in the inactive state, transition into a reverse-bias state to choke current flow from the load to the regulator input terminal of the regulator.

15. A system comprising:

a voltage adjustment section configured to supply a target output voltage to a load;

a power supply section comprising:

a regulator configured to output a regulated voltage that powers the voltage adjustment section;

a management capacitor coupled to a regulator input terminal of the regulator; and a first diode coupling a set of solar substrings to the regulator input terminal of the regulator;

a regulator management section comprising:

a management switch configured to selectively couple the set of solar substrings to an adjustment input terminal of the voltage adjustment section; and a comparator configured to supply control signals to the management switch based on a voltage of the regulator input terminal; and wherein, during a refresh cycle:

the first diode is configured to, in response to a first output voltage from the set of solar substrings falling below a threshold output voltage, transition into a reverse bias state to trigger discharge of the management capacitor; and the comparator is configured to, in response to a first input voltage of the regulator input terminal falling below a threshold input voltage during discharge of the management capacitor, output a first control signal to:

a gate of the management switch to transition the management switch into an inactive state to decouple the set of solar substrings from the adjustment input terminal of the voltage adjustment section; and a first control terminal of the voltage adjustment section to suspend operation of the voltage adjustment section to:

reduce loading of the set of solar substrings;

drive the first output voltage from the set of solar substrings toward the threshold output voltage; and initiate charging of the management capacitor, via the first diode, to maintain operation of the regulator.

16. The system of claim 15, wherein, during the refresh cycle:

the first diode is configured to, in response to a second output voltage from the set of solar substrings exceeding the threshold output voltage, transition into a forward-bias state to charge the management capacitor; and the comparator is configured to, in response to a second input voltage of the regulator input terminal exceeding the threshold input voltage during charging of the management capacitor, output a second control signal to:

the gate of the management switch to transition the management switch into an active state to supply the second output voltage from the set of solar substrings to the adjustment input terminal of the voltage adjustment section; and the first control terminal of the voltage adjustment section to resume operation of the voltage adjustment section to drive the second output voltage from the set of solar substrings toward the target output voltage supplied to the load.

17. The system of claim 15:

wherein the regulator comprises:

a series pass transistor coupling the regulator input terminal to a regulator output terminal; and a set of feedback resistors configured to bias a second gate of the series pass transistor to drive the first input voltage of the regulator input terminal to the regulated voltage at the regulator output terminal; and wherein the voltage adjustment section comprises:

an adjustment driver comprising a first power supply terminal:

coupled to the regulator output terminal; and configured to receive the regulated voltage to power the adjustment driver; and an adjustment inductor:

coupled to the management switch; and configured to receive the first output voltage from the set of solar substrings; and a set of adjustment switches configured to, based on a set of adjustment signals output from the adjustment driver, drive the first output voltage to the target output voltage supplied to the load.

18. The system of claim 15, wherein the voltage adjustment section further comprises:

a balance inductor coupled to a string midpoint terminal between a first subset of solar substrings and a second subset of solar substrings in the set of solar substrings;

a set of balance switches coupled to the balance inductor; and a balance driver configured to, prior to suspended operation of the voltage adjustment section during the refresh cycle, supply a set of balance signals to the set of balance switches to:

alternate electrical coupling to the balance inductor between a string output terminal of the set of solar substrings and a reference potential; and drive a midpoint output voltage of the string midpoint terminal toward a target midpoint voltage.

19. A system comprising:

a voltage adjustment section configured to drive an output voltage, generated by a set of solar substrings, to a target output voltage;

a power supply section configured to output a regulated voltage that powers the voltage adjustment section; and a regulator management section comprising:

a management switch configured to selectively couple the set of solar substrings to the voltage adjustment section; and a comparator configured to, in response to a first input voltage of the power supply section falling below a threshold voltage, output a first control signal to:

a gate of the management switch to transition the management switch into an inactive state to decouple the set of solar substrings from the voltage adjustment section; and a control terminal of the voltage adjustment section to suspend operation of the voltage adjustment section and reduce loading of the set of solar substrings.

20. The system of claim 19, wherein the comparator is configured to, in response to a second input voltage of the power supply section exceeding the threshold voltage, output a second control signal to:

the gate of the management switch to transition the management switch into an active state to supply the output voltage, generated by the set of solar substrings, to the voltage adjustment section; and the control terminal of the voltage adjustment section to resume operation of the voltage adjustment section and drive the output voltage to the target output voltage.

* * * * *